(12) United States Patent
Bishara

(10) Patent No.: US 8,385,204 B1
(45) Date of Patent: *Feb. 26, 2013

(54) BUFFER OVERFLOW PREVENTION FOR NETWORK DEVICES

(75) Inventor: Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 113 days.

This patent is subject to a terminal disclaimer.

(21) Appl. No.: 13/074,340

(22) Filed: Mar. 29, 2011

Related U.S. Application Data

(63) Continuation of application No. 11/204,484, filed on Aug. 16, 2005, now Pat. No. 7,916,640.

(60) Provisional application No. 60/692,075, filed on Jun. 20, 2005.

(51) Int. Cl.
*G01R 31/08* (2006.01)
*H04J 3/18* (2006.01)

(52) U.S. Cl. ........................ 370/235; 370/477

(58) Field of Classification Search .................. 370/235, 370/477
See application file for complete search history.

(56) References Cited

U.S. PATENT DOCUMENTS

| | | | |
|---|---|---|---|
| 6,078,953 A | 6/2000 | Vaid et al. | |
| 6,105,064 A | 8/2000 | Davis et al. | |
| 6,370,114 B1 | 4/2002 | Gullicksen et al. | |
| 7,171,482 B2 | 1/2007 | Jones et al. | |
| 7,246,168 B1 | 7/2007 | Bales | |
| 7,296,288 B1 | 11/2007 | Hill et al. | |
| 2005/0063307 A1 | 3/2005 | Samuels et al. | |
| 2005/0286516 A1* | 12/2005 | Sundaresan et al. | 370/389 |

* cited by examiner

*Primary Examiner* — Mark Rinehart
*Assistant Examiner* — Angel Brockman

(57) ABSTRACT

Methods, apparatus, and computer programs for processing packets. The method includes receiving a packet at a first port of an apparatus, wherein the packet (i) is associated with a first session of a plurality of sessions being maintained by the apparatus and (ii) includes a first transmit window size associated with the first session; storing the packet in a packet buffer prior to retransmitted the packet from the apparatus, the packet buffer having a predetermined size; modifying the first transmit window size as set forth in the first packet based on (i) the predetermined size of the packet buffer, and (ii) a second transmit window size associated with a second session of the plurality of sessions, wherein the second session is separate from the first session; and transmitting the packet having the modified first transmit window size from a second port of the apparatus.

17 Claims, 3 Drawing Sheets

BUFFER OVERFLOW PREVENTION FOR NETWORK DEVICES

CROSS-REFERENCE TO RELATED APPLICATIONS

This disclosure is a continuation of U.S. application Ser. No. 11/204,484 (now U.S. Pat. No. 7,916,640), filed on Aug. 16, 2005, which claims the benefit of U.S. Provisional Patent Application No. 60/692,075 filed on Jun. 20, 2005. The disclosures of the applications referenced above are incorporated herein by reference.

BACKGROUND

The present invention relates generally to data communications. More particularly, the present invention relates to preventing buffer overflow in routers and similar network devices.

FIG. 1 depicts a conventional data communications network 100 that comprises a first plurality of network devices 104A-N that exchange Transport Control Protocol (TCP) packets of data with a second plurality of network devices 106A-N over two or more networks including networks 108A,B connected by a conventional router 102. Each network device 104, 106 comprises a peer-to-peer protocol stack, such as a TCP protocol stack, with dynamically adjustable or pre-negotiated transmit window sizes. The transmit window size for a network device defines the maximum amount of data that can be in transit to that network device at any time. Hence, no peer device sends a burst of continuous data to the network device that is larger than the device's transmit window. A pair of network devices 104, 106 negotiates a window size for one or both devices based on the device's internal pre-configuration, and may adjust the window size according to link bandwidth or round-trip delay. Neither network device 104, 106 allows the amount of pending transmitted data (that is, data transmitted by one network device 104, 106 in the session but not yet acknowledged by the other network device 104, 106 in the session) to exceed the transmit window size.

But while this technique protects network devices 104, 106 in a session from overflows, it does not similarly protect intermediate devices such as switches or router 102 that must handle many such sessions simultaneously. The frequent result is packet buffer overflows in the intermediate devices, resulting in dropped packets and consequent retransmission of those packets, which adversely affects the performance of the data communications network 100.

SUMMARY

In general, this specification describes methods, apparatus, and computer programs for processing packets. In one aspect, the method includes receiving a packet at a first port of an apparatus, wherein the packet (i) is associated with a first session of a plurality of sessions being maintained by the apparatus and (ii) includes a first transmit window size associated with the first session; storing the packet in a packet buffer prior to retransmitted the packet from the apparatus, the packet buffer having a predetermined size; modifying the first transmit window size as set forth in the first packet based on (i) the predetermined size of the packet buffer, and (ii) a second transmit window size associated with a second session of the plurality of sessions, wherein the second session is separate from the first session; and transmitting the packet having the modified first transmit window size from a second port of the apparatus.

The details of one or more implementations are set forth in the accompanying drawings and the description below. Other features will be apparent from the description and drawings, and from the claims.

Figure 1:
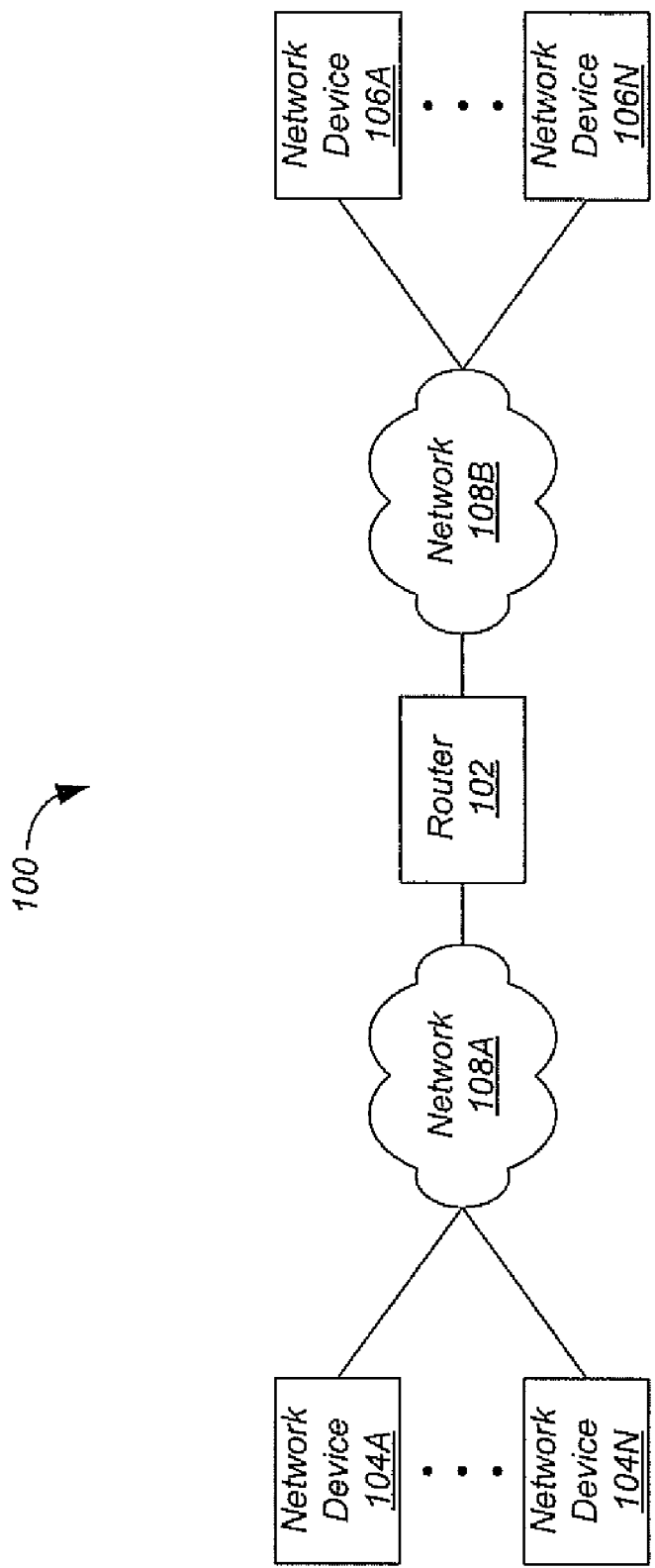
FIG. 1 depicts a conventional data communications network that comprises a first plurality of network devices that exchange Transport Control Protocol (TCP) packets of data with a second plurality of network devices over two or more networks including networks connected by a conventional router.

The leading digit(s) of each reference numeral used in this specification indicates the number of the drawing in which the reference numeral first appears.

DETAILED DESCRIPTION

Embodiments of the present invention allow an intermediate network device to reduce the transmit window size for sessions involving the device, thereby preventing overflows of the packet buffer of the network device, and the consequent dropped packets and retransmissions. The device intercepts packets comprising transmit window size information during the transmit window size negotiation phase, and modifies the transmit window size information based on the size of the packet buffer of the device and transmit window sizes for others sessions handled by the device before forwarding those packets.

Figure 2:
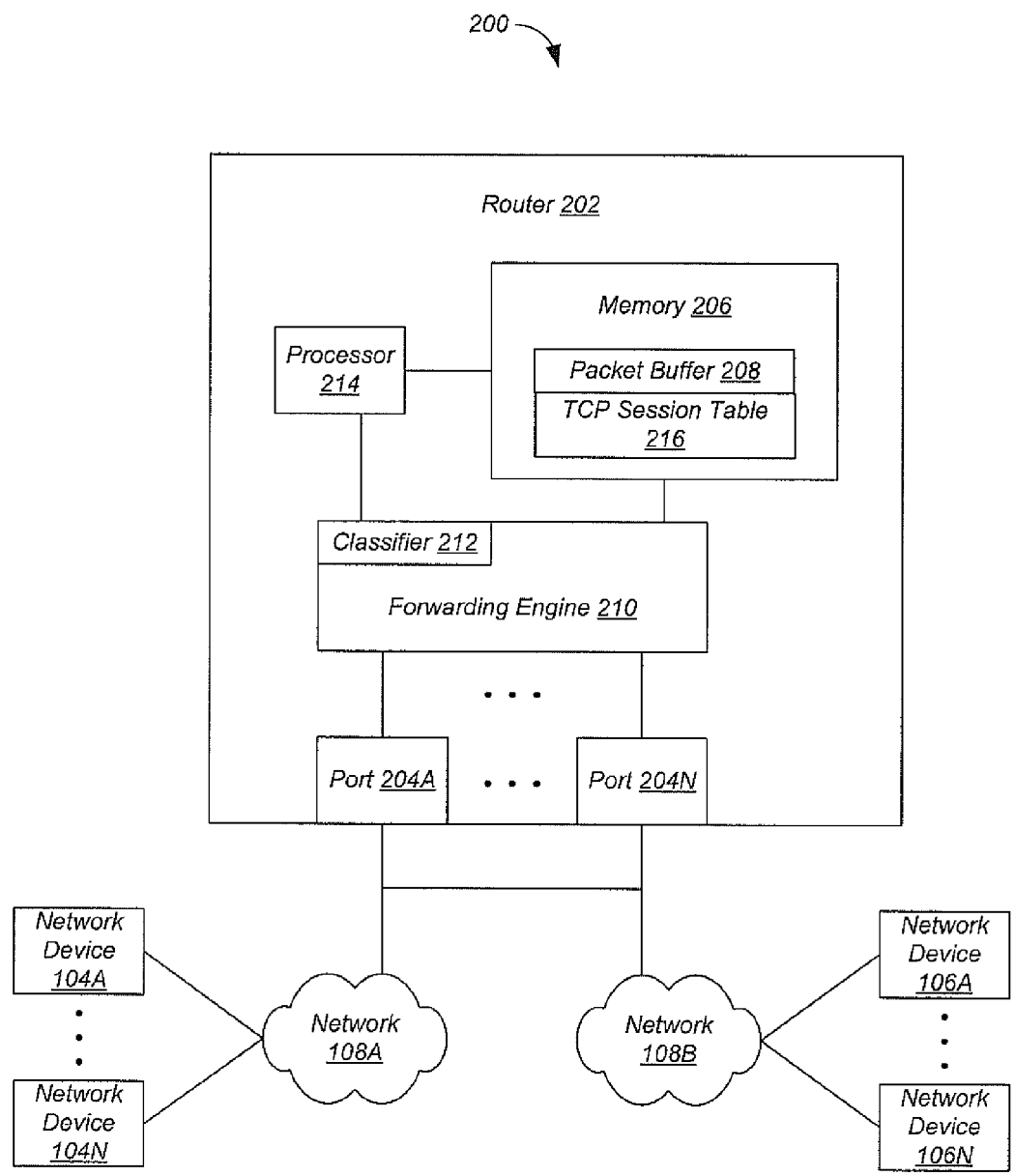
FIG. 2 shows a data communications network that comprises a first plurality of network devices that exchange Transport Control Protocol (TCP) packets of data with a second plurality of network devices over two or more networks including networks connected by a router according to a preferred embodiment.

FIG. 2 shows a data communications network 200 that comprises a first plurality of network devices 104A-N that exchange Transport Control Protocol (TCP) packets of data with a second plurality of network devices 106A-N over two or more networks including networks 108A,B connected by a router 202 according to a preferred embodiment. While embodiments of the present invention are described with respect to a router, other embodiments are implemented as other sorts of network devices such as network switches, as will be apparent to one skilled in the relevant arts after reading this description. Further, while embodiments of the present invention are described with respect to the TCP protocol, other embodiments employ other protocols using pre-negotiated transmit windows, as will be apparent to one skilled in the relevant arts after reading this description.

Router 202 comprises a plurality of ports 204A-N to transmit and receive TCP packets each associated with one of a plurality of TCP sessions, a memory 206 comprising a packet buffer 208 to store the TCP packets, a forwarding engine 210 to transfer the TCP packets between ports 204, a classifier 212 to identify TCP packets that comprise data representing a TCP window size for one or more of the TCP sessions, and a processor 214 to modify the TCP window sizes of the TCP sessions if necessary, for example to prevent overflows of packet buffer 208.

Figure 3:
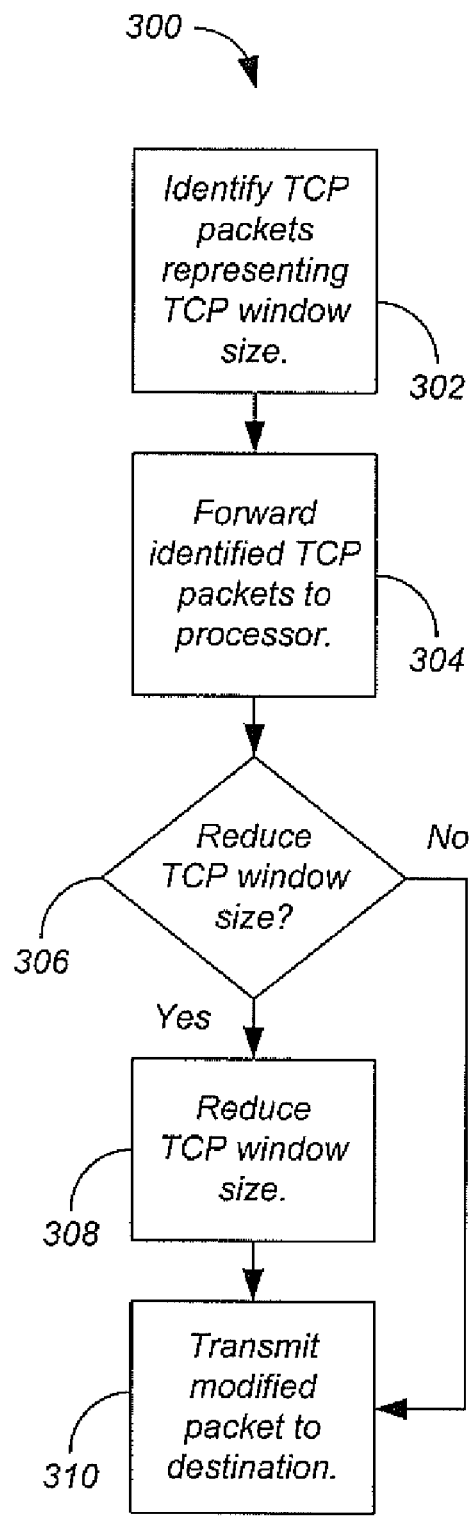
FIG. 3 shows a process for the router of FIG. 2 according to a preferred embodiment of the present invention.

FIG. 3 shows a process 300 for router 202 of FIG. 2 according to a preferred embodiment of the present invention. Classifier 212 examines the TCP packets received by router 202 to identify those TCP packets that comprise data representing a TCP window size for a TCP session (step 302). TCP window sizes are generally negotiated during TCP session setup, which is initiated by TCP packets having the SYN flag set, as is well-known in the relevant arts. Preferably classifier 212 identifies TCP packets comprise data representing a TCP window size for a TCP session according to the status of the SYN flag in the TCP packets. Of course other sorts of TCP packets can comprise data representing a TCP window size for a TCP session. Embodiments of the present invention employ other well-known techniques to identify such TCP packets.

Classifier 212 forwards the identified TCP packets to processor 214 (step 304). Processor 214 examines the TCP window size in each of the forwarded TCP packets to determine whether the TCP window size should be reduced (step 306). Preferably the decision whether to reduce the TCP window size of a TCP session is based on (1) the size of the packet buffer and (2) the TCP window sizes for other TCP sessions currently active in router 202. In some embodiments, the decision is also based on an estimate of the future addition and tear-down of TCP sessions involving router 202, which can be generated based on network history and traffic patterns.

To support this decision, processor 214 maintains a table 216 of TCP window sizes for active TCP sessions in memory 206. Each entry in table 216 includes an identifier of a TCP session (for example, Internet Protocol (IP) addresses for the source and/or destination network device 104, 106 of the TCP session, as well as the TCP source and destination port numbers), and a TCP window size for the TCP session.

Processor 214 adds entries to table 216 as new TCP sessions are created, and removes an entry from table 216 when the respective TCP session becomes inactive. Processor 214 determines that a TCP session has become inactive according to techniques well-known in the relevant arts. A TCP session becomes inactive, for example, when no TCP packets are received for the TCP session within a predetermined interval, or when a TCP packet is received that will terminate the TCP session, such as a TCP FIN packet.

Processor 214 preferably determines whether the TCP window size of the TCP session under consideration should be reduced by comparing the sum of that TCP window size and the TCP window sizes in table 216 with the size of packet buffer 208. In some embodiments, the decision is also based on an estimate of the future addition and tear-down of TCP sessions involving router 202, which can be generated based on network history and traffic patterns. If the sum exceeds the size of packet buffer 208, the TCP window size of the TCP session under consideration should be reduced. Processor 214 therefore reduces the TCP window size (step 308) by modifying the data in the TCP packet to represent a reduced TCP window size. The reduced TCP window size can be obtained by many techniques, for example by taking the difference between the sum and the size of packet buffer 208. One or more of ports 204 subsequently transmits the TCP packet to its destination (step 310).

Embodiments of the present invention can be deployed in one or more network devices in a data communications network. For example, routers according to the present invention can be deployed in networks supporting high-performance computing platforms such as weather prediction systems to optimize network performance.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   a first port configured to receive a packet, wherein the packet (i) is associated with a first session of a plurality of sessions being maintained by the apparatus and (ii) includes a first transmit window size associated with the first session;
   a packet buffer configured to store the packet prior to the packet being retransmitted from the apparatus, the packet buffer having a predetermined size;
   a processor configured to modify the first transmit window size as set forth in the packet based on
   (i) the predetermined size of the packet buffer; and
   (ii) a second transmit window size associated with a second session of the plurality of sessions, wherein the second session is separate from the first session; and
   a second port configured to (i) receive the packet having the modified first transmit window size from the processor and (ii) transmit the packet having the modified first transmit window size from the apparatus.

2. The apparatus of claim 1, wherein the packet comprises a Transmission Control Protocol (TCP) packet.

3. The apparatus of claim 1, wherein the processor is further configured to modify the first transmit window size as set forth in the packet based on an estimate of future addition and tear-down of sessions involving the apparatus.

4. The apparatus of claim 1, wherein:
   the processor is configured to maintain a table of entries, wherein each entry in the table comprises an identifier corresponding to one of the plurality of sessions being maintained by the apparatus, and a transmit window size corresponding to the one of the plurality of sessions being maintained by the apparatus.

5. The apparatus of claim 4, wherein the processor is configured to remove an entry from the table in response to the session corresponding to the entry becoming inactive.

6. The apparatus of claim 5, wherein the processor is configured to determine that a session is inactive in response to (i) no packets being received for the session within a predetermined interval, or (ii) a packet is received that terminates the session.

7. The apparatus of claim 1, wherein the first transmit window size defines a maximum amount of data that can be in transit to a network device in communication with the apparatus.

8. A network device comprising the apparatus of claim 1.

9. The network device of claim 8, wherein the network device is selected from the group consisting of
a network router; and
a network switch.

10. A method comprising:
receiving a packet at a first port of an apparatus, wherein the packet (i) is associated with a first session of a plurality of sessions being maintained by the apparatus and (ii) includes a first transmit window size associated with the first session;
storing the packet in a packet buffer prior to retransmitted the packet from the apparatus, the packet buffer having a predetermined size;
modifying the first transmit window size as set forth in the packet based on
(i) the predetermined size of the packet buffer; and
(ii) a second transmit window size associated with a second session of the plurality of sessions, wherein the second session is separate from the first session; and
transmitting the packet having the modified first transmit window size from a second port of the apparatus.

11. The method of claim 10, wherein the packet comprises a Transmission Control Protocol (TCP) packet.

12. The method of claim 10, wherein modifying the first transmit window size as set forth in the packet further comprises modifying the first transmit window size based on an estimate of future addition and tear-down of sessions involving the apparatus.

13. The method of claim 10, wherein the first transmit window size defines a maximum amount of data that can be in transit to a network device in communication with the apparatus.

14. A computer program product comprising a computer program stored on a computer-readable memory device, the computer program product further comprising instructions for causing a programmable processor to:
receive a packet at a first port of an apparatus, wherein the packet (i) is associated with a first session of a plurality of sessions being maintained by the apparatus and (ii) includes a first transmit window size associated with the first session;
store the packet in a packet buffer prior to retransmitted the packet from the apparatus, the packet buffer having a predetermined size;
modify the first transmit window size as set forth in the packet based on
(i) the predetermined size of the packet buffer; and
(ii) a second transmit window size associated with a second session of the plurality of sessions, wherein the second session is separate from the first session; and
transmit the packet having the modified first transmit window size from a second port of the apparatus.

15. The computer program product of claim 14, wherein the packet comprises a Transmission Control Protocol (TCP) packet.

16. The computer program product of claim 14, wherein the instructions to modify the first transmit window size as set forth in the packet further comprise instructions to modify the first transmit window size based on an estimate of future addition and tear-down of sessions involving the apparatus.

17. The computer program product of claim 14, wherein the first transmit window size defines a maximum amount of data that can be in transit to a network device in communication with the apparatus.

* * * * *